2,307,990

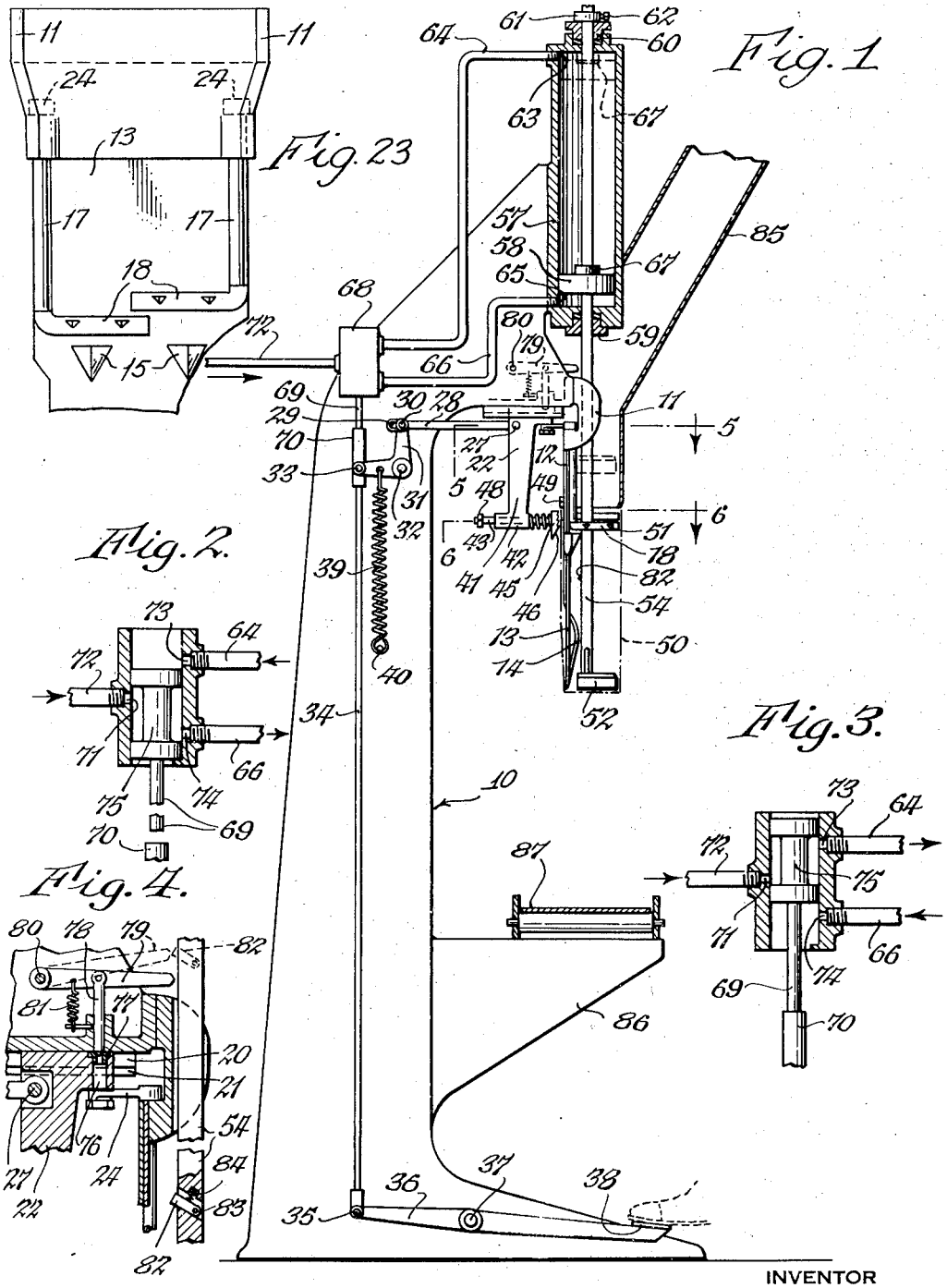
Jan. 12, 1943.    H. F. BRIGGS    2,307,990
BAG OPENING, SHAPING AND FILLING DEVICE
Filed April 8, 1939    4 Sheets-Sheet 1
INVENTOR
Howland F. Briggs
BY Ross C. Muney
ATTORNEY Jan. 12, 1943.  H. F. BRIGGS  2,307,990
BAG OPENING, SHAPING AND FILLING DEVICE
Filed April 8, 1939  4 Sheets-Sheet 2
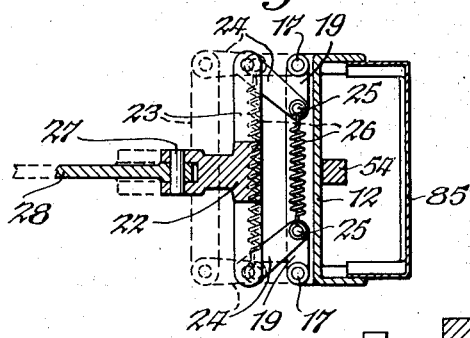
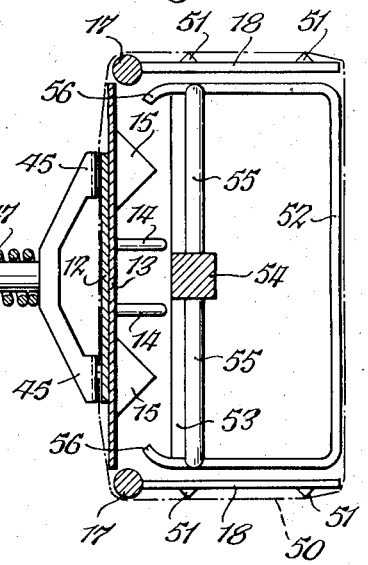
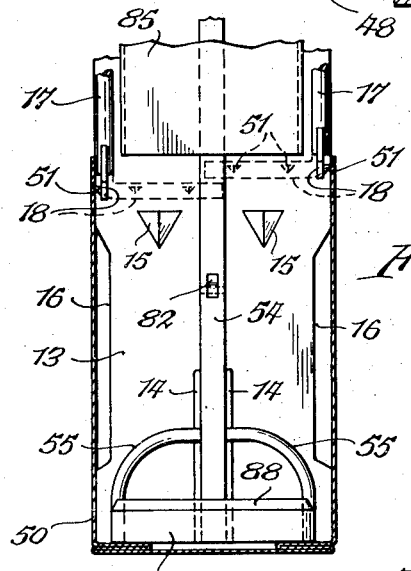
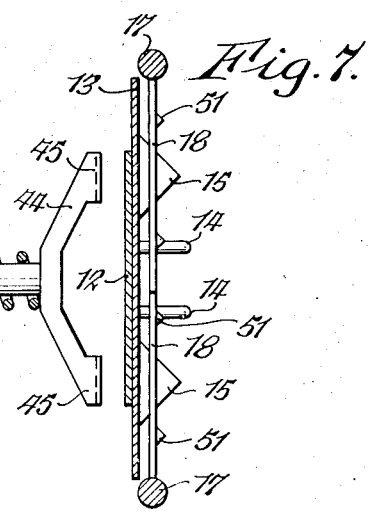
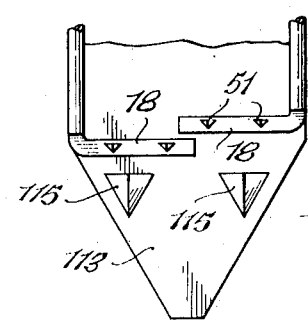
INVENTOR
Howland F. Briggs
BY Ross C. Hurrey
ATTORNEY Jan. 12, 1943.                H. F. BRIGGS                 2,307,990
                BAG OPENING, SHAPING AND FILLING DEVICE
                Filed April 8, 1939          4 Sheets-Sheet 3
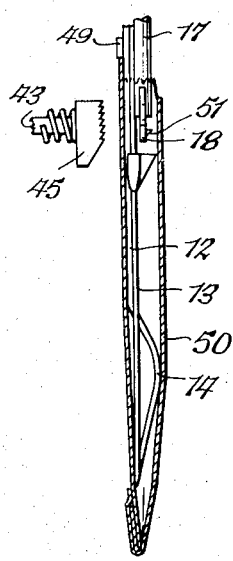
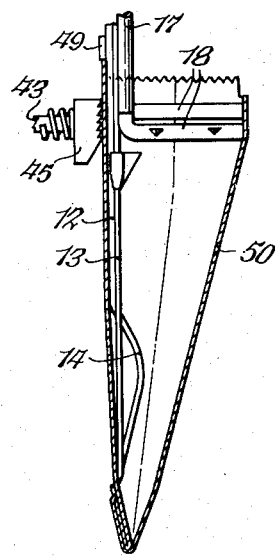
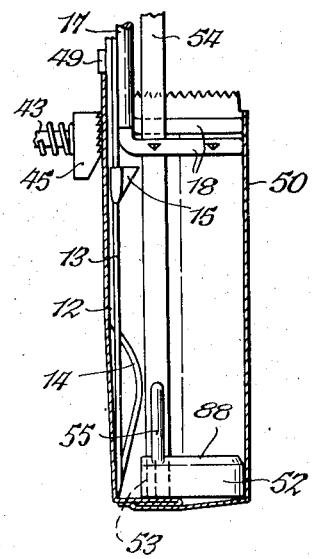
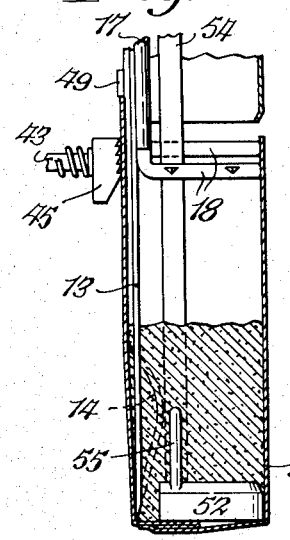
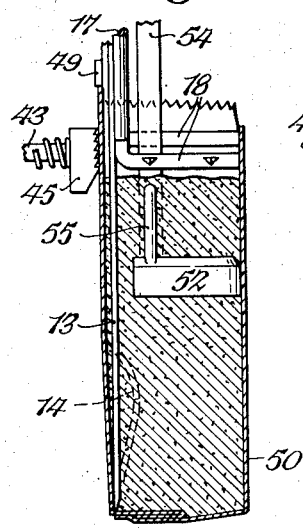
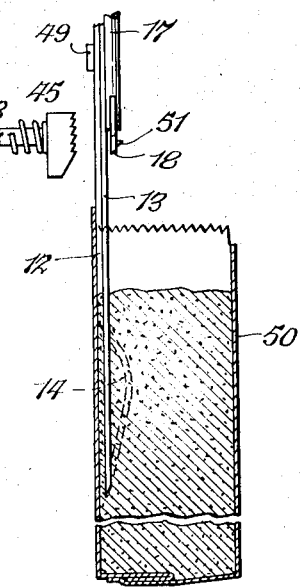
INVENTOR
Howland F. Briggs
BY
Ross C. Hurney
ATTORNEY Jan. 12, 1943. H. F. BRIGGS 2,307,990
BAG OPENING, SHAPING AND FILLING DEVICE
Filed April 8, 1939 4 Sheets-Sheet 4
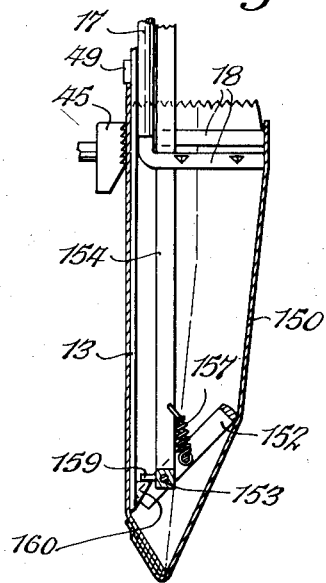
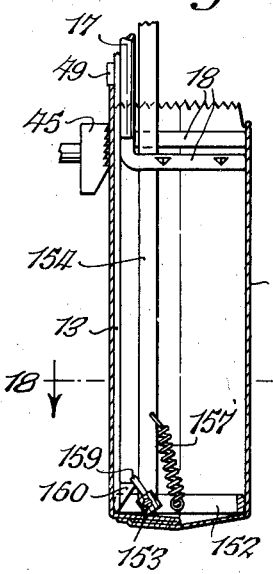
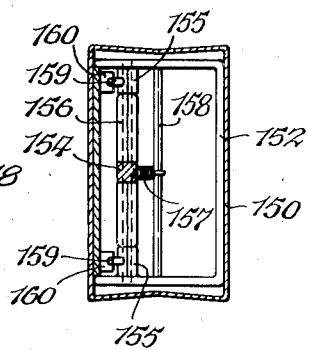
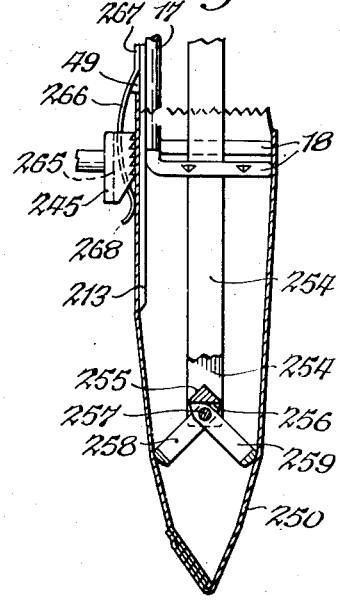
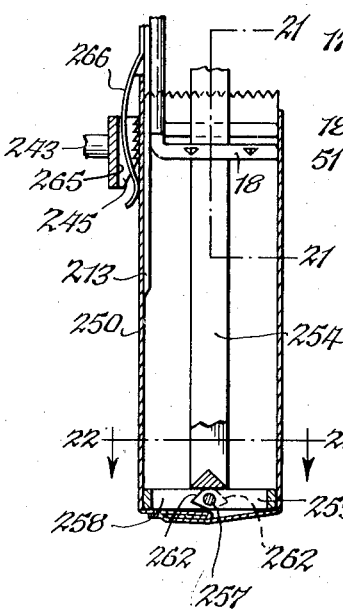
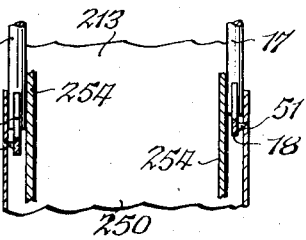
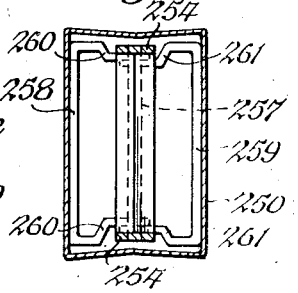
INVENTOR
Howland F. Briggs
BY
Ross C. Hurney
ATTORNEY Patented Jan. 12, 1943

UNITED STATES PATENT OFFICE 2,307,990

BAG OPENING, SHAPING, AND FILLING DEVICE

Howland F. Briggs, Buffalo, N. Y., assignor to Consolidated Packaging Machinery Corporation, Buffalo, N. Y., a corporation of New York Application April 8, 1939, Serial No. 266,734

7 Claims. (Cl. 226—59)

The present invention relates to a bag opening device and, more particularly, to a device which is adapted to open and square the mouth and body of a bag and to form a rectangular bottom therein. The device may conveniently include means for filling a bag which has thus been opened and squared.

In the packaging of many commodities it is highly desirable to use paper bags. It has long been known to use paper bags for the formation of loose, shapeless packages containing commodities of most any type. In certain specialized fields, it is necessary for packages to present a sightly appearance and to assume definite shape for convenience in handling and packing in cases. The merchandising of sugar, coffee, cocoa, etc., are examples of fields in which the latter packaging demands must be met.

Paper bags of certain specific forms have been developed to meet the demands outlined above and also to provide for ease in the opening and filling operations incident to use of such bags. For example, the so-called automatic or ABC bag may be opened to a definite rectangular shape by the mere introduction of a blast of air therein or by merely snapping the same through the air. When such a bag is used with automatic machinery, it needs only the simplest manipulation to effect satisfactory opening. As a matter of fact, such bags need only to be opened at the mouth in many instances because the mere introduction of material into the bag will complete the opening thereof to satisfactory rectangular shape. The advantages of the automatic bag are secured by providing the closed end of the same with a completely preformed bottom of rectangular dimensions substantially equal to those of the mouth of the bag when fully opened. The preformed bottom is folded along one of its edges into flat engagement with a side wall of the bag. Thus, any pressure exerted upon the bottom during the opening of the bag will result in movement of the bottom to its final position.

Various forms of bags having preformed bottoms are available. A few of the popular types are known as self-opening, satchel-bottom or diamond-fold bags.

There are, however, other types of bags which do not lend themselves to such easy opening, squaring and bottom formation. Such bags include all those in which a bottom has not been preformed. From the standpoint of cost alone and particularly from the standpoint of cost coupled with sift-proof characteristics, certain types of bags having no preformed bottom are particularly desirable. One example of this type of bag is known as the square bag. The square bag consists of a gusseted flattened tube cut to desired size. One end of the bag is closed by simply folding the end upon itself and pasting the folded end to an outer wall of the bag body. This forms a simple fold-over seam at the lowermost point in the bag body which must be flattened out and drawn upwardly in order that a rectangular bottom may be formed when the bag is opened. It is obvious that a bag of this type cannot be opened by an air blast or by the introduction of a commodity therein. In order that a satisfactory rectangular bottom may be formed, the bag must be opened and the bottom squared by deliberate manipulation prior to filling. Another example of this type of bag is formed as a gusseted tube and an end is closed merely by stitching across the tube to secure the front and rear walls together.

It is an object of the present invention to provide a machine which will open and square bags of any of the types discussed above.

It is a further object of the present invention to provide a machine which will open and square the bottoms of bags of those types whose bottoms must be squared prior to filling.

Other and further objects of this invention will become more apparent from the consideration of the following description of preferred but not necessarily the only forms of the invention taken in connection with the drawings accompanying and forming a part of this specification.

In the drawings,

Fig. 1 is an elevational view of one form of machine constructed according to my invention;

Figs. 2 and 3 are detailed sectional views of a valve useful in connection with the machine shown in Fig. 1;

Fig. 4 is a detailed sectional view of a latch mechanism forming a part of Fig. 1;

Fig. 5 is a section along the line 5—5 of Fig. 1 looking in the direction of the arrow;

Fig. 6 is a section along the line 6—6 of Fig. 1 looking in the direction of the arrow;

Fig. 7 is a partial sectional view showing certain parts in a position different from that illustrated in Fig. 6;

Fig. 8 is a front elevation of a portion of the machine shown in Fig. 1;

Fig. 9 is a front elevational view of a modification;

Figs. 10, 11, 12, 13, 14 and 15 are operative views illustrating the sequence of operation of the machine shown in Fig. 1;

Fig. 16 is a side elevation of a portion of the machine shown in Fig. 1 and showing a bottom squarer of modified form;

Fig. 17 is a view similar to Fig. 16 showing the bottom squarer in operated position;

Fig. 18 is a section along the line 18—18 of Fig. 17;

Fig. 19 is a view similar to Fig. 16 and illustrating a different modified form of bottom squarer;

Fig. 20 is a view similar to Fig. 19 showing the bottom squarer in operated position;

Fig. 21 is a section along the line 21—21 of Fig. 20;

Fig. 22 is a sectional view taken along the line 22—22 of Fig. 20; and

Fig. 23 is an enlarged elevational view of a portion of the mechanism shown in Fig. 1.

Similar characters of reference indicate similar parts throughout the several views.

Referring now to the drawings, there is shown a machine and various modifications thereof constructed according to my invention. In Fig. 1 one form of bag opening and squaring device is shown in association with convenient operating mechanism therefor. The device as a whole is supported upon a base or pedestal 10. Adjacent its upper end the pedestal 10 carries a pair of forwardly projecting brackets 11 upon which certain of the elements of my bag opening and squaring device are mounted.

The brackets 11 support a plate 12 to which is secured another plate 13 whose general outline dimensions are substantially equal to the dimensions of a main wall of the bag with which the device is to be used. The plate 13 is preferably supported in a vertical position in order that a flattened bag may be introduced thereover and drawn up to such a position that the plate 13 will substantially coincide with a main wall of the bag when the same is opened. In order to facilitate drawing of the bag up over the plate 13, it may be desirable to provide a pair of curved guides 14 which may conveniently be formed of wire and secured to the plate 13 in any suitable manner. The guides 14 are shaped to present smooth inclined surfaces to the interior of the bag and to assist in partially opening the body thereof. It may also be found that the provision of additional guide elements 15 is desirable. As shown in the drawings the guides 15 may be pyramidal in shape in order that they may present an inclined surface to the interior of the bag and thus insure that the bag mouth will be sufficiently open to clear the mouth opening elements to be described hereinafter.

The plate 13 may be cut away as at 16 in order to reduce frictional engagement between the edges of the plate and the interior of the bag if so desired.

Each of the brackets 11 is formed with a bearing adapted to rotatably support one of a pair of vertical shafts 17. At the lower end of each of the shafts 17 there is secured an arm 18. The arms 18 are adapted to turn with the shafts 17 and for the purpose of my present invention the arms 18 are arranged to swing in a generally horizontal plane from positions parallel with and closely adjacent to the plate 13 to positions generally perpendicular to the plate 13. To this end the upper end of each of the shafts 17 is provided with a crank 19 which cooperates with mechanism to be hereinafter described.

The arms 18 are of a length substantially equal to the width of the side walls of the bag with which the device is to be used and are so located with reference to plate 13 as to just enter the mouth of a bag which has been drawn upon the plate 13 as previously described. As will be more fully described hereafter, the arms 18 will normally lie in the position illustrated in Figs. 7 and 10 in which they are closely adjacent to the plate 13. As a bag is drawn upwardly upon the plate 13, the guides 14 and 15 will insure opening of the bag mouth sufficiently to clear the arms 18 in this position. As shown in Figs. 7 and 8, the arms 18 may be vertically offset in order that they may overlap without interference. This vertical offsetting may be necessary in all cases wherein the length of the arms 18 is greater than one-half the width of the plate 13.

When the arms 18 are moved from the position illustrated in Figs. 7 and 10 to the position illustrated in Fig. 6, for example, they will serve to move the front wall of the bag outwardly and to spread the side walls apart. The bag mouth is thus opened to rectangular outline and is supported on three sides by the arms 18 and plate 13.

Referring now to Figs. 1 and 4, it will be seen that the pedestal 10 is provided with a horizontal slideway 20 which may conveniently comprise a pair of spaced parallel angles having inwardly projecting flanges 21 forming horizontal bearing surfaces upon which a suitably flanged slide 22 is supported. The slide 22 carries a horizontal cross arm 23 at each end of which is pivotally mounted one of a pair of links 24. Each of the links 24 is pivotally connected as by a pivot pin 25 to one of the cranks 19 on the upper ends of shafts 17. A contractile spring 26 is stretched between the pivot pins 25 and tends to urge the arms 19 and links 24 into the full line position illustrated in Fig. 5. In this position, the shafts 17 have been rotated to move the arms 18 to the mouth opening position illustrated in Fig. 6. Horizontal movement of the slide 22 to the left as viewed in Fig. 5 will cause the toggles formed by the links 24 and cranks 19 to straighten against the force of spring 26 and will result in rotation of the arms 18 to the position illustrated in Fig. 7.

The slide 22 is provided with a horizontal pivot 27 (Figs. 1 and 4) upon which is freely pivoted one end of a link 28. At its opposite end the link 28 is provided with an elongated slot 29 which receives a suitable pin 30 carried by one arm of a bell crank lever 31 pivoted at 32 to the pedestal 10. The other arm of the bell crank lever 31 is pivotally connected at 33 with a vertically movable rod 34 the lower end of which is pivotally connected as at 35 to one end of a two-arm lever 36. The lever 36 is pivoted at 37 to the pedestal 10 and carries at its opposite end a foot treadle 38.

The mechanism just described is so arranged that depression of the foot treadle and the resultant upward motion of the rod 34 will rock the bell crank 31 in a clockwise direction and impart horizontal motion to the slide 22 in a direction to the right as viewed in Fig. 1. In the position of the parts illustrated in Fig. 1 the foot treadle has been depressed and the slide 22 is moved to its operated position. This position corresponds to that illustrated in full lines in Fig. 5.

A contractile spring 39 is stretched between an arm of the bell crank 31 and an anchorage 40 on the pedestal 10. The spring 39 is superior to the spring 26 shown in Fig. 5. It will thus be seen that removal of pressure from the treadle 38 will allow the spring 39 to turn the bell crank 31 in a counterclockwise direction to move the link 28 and slide 22 in a direction to the left as viewed in Fig. 1. The position thus assumed by the slide 22 is illustrated in dotted lines in Fig. 5. Depression of the foot treadle 38 thus results in swinging of the arms 18 to the mouth opening position illustrated in Fig. 6 and removal of pressure from the treadle 38 results in movement of the arms 18 to the position illustrated in Fig. 7.

In Figs. 1, 6 and 7, there is shown a means for clamping a bag in position to be opened. To this end, the slide 22 is provided with a downwardly projecting arm 41 terminating in a horizontal bearing 42 in which is received a slide rod 43. The rod 43 extends toward the plate 12 and carries a suitable device for clamping a wall of a bag to the plate 12. As shown in the drawings, this clamping device may conveniently comprise a yoke 44 whose arms terminate in clamp jaws 45 which may have suitable friction surfaces. For example, they may be serrated as illustrated in Fig. 1. The jaws may further be chamfered as shown at 46 to facilitate the introduction of a bag wall between the jaws and the plate 12. An expansive spring 47 may be strung upon the slide rod 43 to urge the clamping device toward the plate 12. A stop collar 48 may be secured to the opposite end of the slide rod 43 to limit the movement of the clamping device under the influence of spring 47.

The clamp jaws 45 and stop collar 48 are preferably so proportioned that in the rearward position of the slide 22, as represented in dotted lines in Fig. 5 and shown in Fig. 7, the clamp will be in an inoperative position. Upon forward movement of the slide, the clamp is moved to gripping engagement with the plate 12. Preferably, this gripping engagement occurs almost immediately upon initiation of forward movement of the slide and prior to a substantial movement of the arms 18 toward mouth opening position. Continued forward movement of the slide will compress the spring 47 and increase the clamping pressure exerted by the clamp pads 45.

As shown in Fig. 1, a stop 49 may be secured to the plate 12 in a position for abutment by the upper edge of the bag wall inserted between the jaws 45 and plate 12. Preferably, the stop 49 serves to limit the extent to which a bag may be drawn over the plate 13 to an amount sufficient to place the lower edge of the plate 13 at the line along which the bag will be folded in the formation of a bottom. In many bags of the square type a score line is formed parallel to the bottom fold and at such a distance therefrom as to predetermine the proper fold line for the formation of a bottom of rectangular dimensions equal to those of the body of the bag. When such a bag is used, it is obvious that the stop 49 will be so located as to position such score line along the lower edge of the plate 13. The provision of such a score line is not essential as it is obvious that the position of the stop 49 may be so selected that the bag will be properly bent or folded when the bottom is squared. Thus, the stop 49 is preferably so positioned that when a bag is in contact therewith there will be only sufficient bag material extending below the edge of plate 13 to form the bottom.

The mechanism thus far described operates as follows: Starting with the machine in a position corresponding to that illustrated in Figs. 7 and 10, it will be seen that a flattened paper bag indicated at 50 may be introduced over the lower edge of the plate 13 and drawn upwardly thereover until the rear wall contacts the stop 49. The bag is manually held in this position and pressure is applied to the foot treadle 38. The resultant forward motion of slide 22 operates first to set the clamp jaws 45 against the bag and the plate 12. Continued foot pressure serves to swing the arms 18 as above described to open the mouth of the bag. If so desired, the arms 18 may be provided with impaling pins 51 which penetrate or at least partially penetrate the side walls of the bag and serve to assist in holding the mouth of the bag in a horizontal plane. When the bag is thus held, it is ready for the operations of opening the body and squaring of the bottom by the means now to be described.

According to the present invention, there is provided means which may be introduced through the open bag mouth and projected through the body of the bag to an extent sufficient to form the lower portion of the bag body into a rectangular bottom of dimensions substantially equal to those of the open mouth. To this end, there is provided a generally rectangular head 52 whose rectangular dimensions are as nearly equal to those of the open bag mouth as is practicable. As shown in Fig. 6, the head 52 may be formed from relatively thin strip material bent to form a rectangle having an open side. The open side may be closed by a cross member 53 which is secured to a vertically movable plunger 54. The connection between the plunger 54 and the head 52 may be further strengthened by the provision of arched reinforcing members 55 connected respectively to the plunger 54 and the head 52. The free ends 56 of the strip material forming the open-sided rectangle may be extended as far beyond the cross arm 53 as is practicable. It may be desirable to curve these ends inwardly as shown in the drawing in order that they may clear certain parts of the mouth opening mechanism.

From the above, it will be apparent that there is provided a head 52 of skeleton construction and presenting a rectangular outline which may be inserted through the open bag mouth and projected to the closed end of the bag to form a rectangular bottom. As shown in the drawings, the head 52 together with the lower edge of the plate 13 serve to define a rectangle substantially equal in its dimensions to those of the opened bag mouth. It is obvious that the head 52 may take various forms and while the particular head herein described is preferable, the invention is not to be limited to this specific structure. The essential feature of the invention lies in the provision of means which will serve to positively form a rectangular bottom in the closed end of a bag.

The head 52 may be inserted into the bag in any convenient manner. In the drawings there is shown one form of mechanism for projecting the head into the bag body in timed relation with the operation of the mouth opening mechanism above described. To this end, the plunger 54 is extended upwardly and becomes the piston rod of a cylinder and piston fluid pressure motor. One form of fluid pressure motor is illustrated at Fig. 1 wherein a cylinder 57 is mounted at the upper end of pedestal 10. The cylinder has within it a piston 58 secured to the upper extension of the plunger 54. The cylinder 57 is closed at its lower end by a suitable head and a fluid tight packing 59 of any conventional type which allows for movement of the plunger 54 therethrough. The plunger 54 continues upwardly through the cylinder and passes through a head and fluid tight packing 60 at the upper end thereof and continues for a sufficient distance therebeyond to insure constant guiding of the plunger 54 by the two ends of the cylinder. Above the upper head and packing 60 the plunger 54 may be provided with an adjustable stop collar 61 which may be moved along the plunger to limit the downward extent of movement of the plunger and head 52 carried thereby. The collar 61 may be held in adjusted position by means such as set screw 62.

The cylinder 57 is provided with an upper fluid pressure port 63 located adjacent the upper head and communicating with a suitable tube 64. The cylinder 57 is also provided with a lower fluid pressure port 65 located adjacent the lower cylinder head and communicating with a fluid pressure tube 66.

As will be apparent from the above description, the fluid pressure medium may be introduced to the cylinder through tube 64 and port 63 to move the piston 58 downwardly to any extent permitted by the stop collar 61. Similarly the introduction of fluid pressure medium through tube 66 and port 65 will move the piston 58 upwardly. It is preferred to provide the piston 58 with a stop shoulder 67 to limit the upward movement of the piston to prevent closing of the upper port 63.

Alternate direction of fluid pressure to the upper and lower portions of the cylinder 57 and suitable arrangements for exhaust may be effected by valve mechanism of any suitable type. The drawings show a simple form of valve which may be controlled in timed relation with the operation of the mouth opening mechanism above described. As shown in Fig. 1, a valve 68 may be placed on the pedestal 10 in such position that its slide operating rod 69 may depend into operative position directly above a head 70 carried by the upper end of the pedal-controlled rod 34.

In Figs. 2 and 3 the valve 68 is shown in its two operative positions. As shown in these figures, the valve may comprise a cylindrical body open at both ends to the atmosphere. The valve body is provided with a fluid pressure inlet port 71 communicating through a tube 72 with a suitable source of fluid pressure (not shown). The valve body is further provided with a port 73 communicating through the tube 64 with the upper portion of the cylinder 57. The valve body is further provided with a port 74 communicating through the tube 66 with the lower portion of the cylinder 57. The valve body receives a suitable double headed slide 75 and the ports 71, 73 and 74 are so arranged relative to this slide as to provide for alternate direction of the fluid pressure from the tube 72 to the tubes 64 and 66 respectively. Thus, in the position illustrated in Fig. 2, the valve is positioned to direct the fluid pressure to the tube 66 to produce upward movement of the piston 58. In the position illustrated in Fig. 3, the fluid pressure is directed to the tube 64 to produce a downward movement of the piston 58. From a consideration of the valve 68, it will be apparent that it also provides for exhausting of that portion of the cylinder to which the fluid pressure medium is not directed. Thus, in the position shown in Fig. 2, the upper portion of the cylinder may exhaust through the tube 64 and port 73 to the atmosphere while in the position illustrated in Fig. 3, the lower portion of the cylinder may exhaust through the tube 66 and port 74 to the atmosphere.

The valve 68 above described is balanced, that is, fluid pressure will constantly be directed with equal force against the upper and lower heads of the slide 75. Consequently the force of gravity will tend to maintain the slide in its lowermost position as illustrated in Fig. 2. For a purpose to be explained hereinafter, the head 70 and operating rod 69 are so proportioned as to provide a lost motion therebetween. As shown in Fig. 2, the head 70 is shown in a retracted position out of contact with the rod 69 while in Fig. 3 the head 70 has been moved upwardly into contact with the rod 69 and has raised the valve slide 75 to its upper position.

When the valve 68 is connected for operation by the rod 34 as above described, it will be apparent that depression of the foot treadle 38 will first take up the lost motion between head 70 and rod 69 and will then move the valve to the position illustrated in Fig. 3 wherein fluid pressure medium is directed to the upper chamber of cylinder 57 to result in downward projection of the bottom squaring head 52. Release of foot pressure will immediately move the valve to the position illustrated in Fig. 2 to result in upper movement of the bottom squaring head to the position illustrated in dotted lines in Fig. 1. The lost motion between head 70 and rod 69 is of sufficient extent to permit taking up of the lost motion between bell crank 31 and link 28 and to permit operation of the mouth opening mechanism to be substantially complete before the valve 68 operates to effect downward movement of the bottom squaring head 52. This particular timing of the bottom squaring head 52 is provided in order that the arms 18 may be moved to their outermost position and thus out of the way of the head 52 before it is attempted to move the head downwardly into the bag.

It is also necessary to secure complete removal of the head 52 from the bag prior to collapse of the arms 18 and to this end the following mechanism is provided. Referring now to Fig. 4, the slide 22 is provided with an opening 76 into which a hardened insert 77 may be introduced. The insert 77 is provided with a recess or opening for the reception of a latch pin 78 mounted for vertical sliding movement in the pedestal 10 and pivotally connected to a lever 79 pivoted at 80 to the pedestal 10. A suitable contractile spring 81 may be provided to urge the lever 79 to rotate in a clockwise direction, thus constantly urging the latch pin 78 in a downward direction. The insert 77 in the slide 22 is so located as to be presented for cooperation with the latch pin 78 when the slide 22 is moved to its forward position. Thus, when the slide is moved forwardly to open the bag mouth and has reached the forward limit of such motion, the pin 78 will drop into the recess 77 and the slide will be latched in this position. As discussed above, the operation of valve 68 occurs after the movement of slide 22 is substantially complete. The actual movement of plunger 52 downwardly into the bag body will occur after the slide 22 is latched in its forward position. After the bottom squaring operation is complete and after filling of the bag is completed the operator may release pedal pressure upon the treadle 38 resulting in counterclockwise rotation of bell crank 31 and also resulting in immediate downward movement of the valve slide 75. As above described, a lost motion connection is provided between the bell crank 31 and the link 28. It is, therefore, apparent that release of pedal pressure will result in a reversal of the valve 68 and consequent upward movement of the bottom squaring head 52 while the slide 22 remains latched in its forward position. Immediately that the head 52 passes the arms 18 in its upward travel, the latch 77, 78 may be released by any suitable mechanism and the spring 39 will serve through bell crank 31 to return the slide 22 to its initial position.

In the drawings, I have shown a pass-by pawl 82 pivoted at 83 within the plunger 54. A spring 84 may be provided to urge the pass-by pawl into projected position as illustrated in full lines in Fig. 4. The latch lever 79 may be extended to a position closely adjacent the plunger 54 for abutment with the pass-by pawl 82. Upon upward movement of the plunger 54 the pass-by pawl 82 will strike the end of lever 79 and lift the lever to release the latch 78 and thus release the slide 22 for rearward motion under the influence of spring 39. The pass-by pawl 82 is so located within the plunger 54 as to trip the latch immediately after the head 52 moves above the arms 18. In the downward movement of the plunger 54 the pass-by pawl 82 will idly pass the projected end of the lever 79, the spring 84 yielding to permit clockwise movement of the pawl.

Suitable means may be provided for filling the bag after it has been opened and squared. As shown in Fig. 1, a chute 85 may be supported by the pedestal 10 in such position as to terminate directly above the mouth of the opened bag. The chute 85 may extend upwardly to any suitable source of material supplied. It is contemplated that definite charges of material may be released for passage through the chute 85 to the bag by any suitable control means.

The pedestal 10 may further be provided with a bracket 86 projecting beneath the bag opening mechanism. The bracket 86 is provided to support a conveyor 87 of any suitable type. The conveyor 87 is preferably driven either continuously or intermittently and is arranged directly beneath the bag opening and filling station. This arrangement is of particular advantage in that a filled bag may be released by the clamping device 45 and allowed to gravitate directly upon the conveyor 87 to be carried away.

In the particular form of device described above, it is apparent that the filling operation will occur while the bag squaring head 52 remains in its operated position as illustrated, for example, in Fig. 1. The head must then be withdrawn upwardly through the material contained within the bag. It has, therefore, been found to be desirable to bevel the upper edges of the rectangular portion of the head 52 as indicated at 88. In this connection, it may be noted that the cross arm 53 may be similarly beveled or diagonally positioned in order that it will not retain any great amount of bag filling material.

The operation of the device, as thus far described, will now be briefly reviewed. A bag is positioned upon the plate 13 and the foot treadle is depressed to clamp the bag in position to open the mouth thereof as heretofore described. Further depression of the foot treadle will result in projection of the head 52 through the open mouth and to the bottom of the bag as above described. When the bottom of the bag has been completely squared by the head 52 the operator may actuate any suitable control (not shown) to initiate the flow of bag filling material through the chute 85. When filling is complete pedal pressure may be removed from the treadle 38 resulting in withdrawal of the head 52 and subsequent collapse of the mouth opening arms 18 and finally in the release of the clamping devices 45. The filled bag will then freely gravitate upon the conveyor 87 which may carry it to any suitable point for further processing.

Figs. 10 to 15 inclusive illustrate the progressive steps of operation of the principal elements of the device. In Fig. 10 the bag 50 is shown in proper position upon the plate 13 as determined by the stop 49. In this figure, it may be seen that the guides 14 and 15 have served to partially open the bag body thus insuring clearance of the bag mouth over the mouth opening arms 18. A clamp jaw 45 is shown in open position.

In Fig. 11 the clamp jaw 45 has been moved to gripping engagement with the bag and plate 12. The arms 18 have been rotated to mouth opening position and the bag is now in position for reception of the bottom squaring head. In Fig. 12, the bottom squaring head 52 has been projected through the bag mouth and progressively through the body of the bag to fully open the same and thereby to draw the lower portion of the bag body upwardly to form a rectangular bottom whose outline conforms to the rectangular outline defined by the head 52 and lower edge of the plate 13. It will be apparent from a comparison of Figs. 11 and 12 that the bottom seam of the bag has been flattened out and drawn upwardly by the action of the bottom squaring head 52.

In Fig. 13 the filling operation has been initiated while in Fig. 14 the filling operation has been completed and the upward movement of the head 52 has been initiated. In Fig. 15 the head 52 has been completely withdrawn and the arms 18 have returned to their original position. The clamp 45 has been released and the bag 50 is illustrated as gravitating from the opening and filling device.

Referring now to Fig. 9, there is illustrated a modified form of the invention incorporating a back plate 113 of a form different from the plate 13 illustrated in Figs. 1, 8 and 10 to 15 inclusive. The plate 113 is shown in Fig. 9 as extending only a short distance below the mouth opening arms 18. The plate 113 is preferably tapered to facilitate introduction of a bag mouth thereover and may be provided with guides 115 similar in all respects to the guides 15 above described. A plate of the form shown at 113 may be substituted for the plate 13 in the device as above described. In such event, it is obvious that the bottom of the bag will correspond in its rectangular conformation to that of the head 52. The plate shown at 113 lends itself to much more rapid insertion into a bag and may be used in any structure wherein it is possible to make the head 52 of dimensions substantially equal to those of the open bag mouth.

In Figs. 16, 17 and 18 there is shown a modified form of bottom squaring head which may be advantageously used in the opening and filling device heretofore described. As shown in these figures a bottom squaring head 152 of generally rectangular conformation is pivotally connected to the lower end of a plunger 154 as by a rock shaft 153 pivoted at its ends in trunnions 155 formed upon the head 152. The rock shaft 153 passes through the lower end of plunger 154 which is maintained centrally of the rock shaft by means such as spacing collars 156. A contractile spring 157 is stretched between the plunger 154 and a suitable cross bar 158 secured to the head 152. The spring 157 urges the head 152 to swing about the rock shaft 153 into the position illustrated in Fig. 16. Each of the trunnions 155 may have formed thereon a trigger 159 positioned to contact one of the pair of lugs 160 secured adjacent the lower end of the plate 13.

In the operation of the modified device illustrated in Figs. 16, 17 and 18 a bag 50 is positioned and gripped and the mouth thereof is opened by the arms 18 as above described. The plunger 154 is moved downwardly into the bag with the head 152 in an upwardly tilted position as illustrated in Fig. 16. In this position, the head 152 serves to progressively open the bag body without the exertion of undue friction on the bag walls. When the plunger has been moved to the position illustrated in Fig. 16 the triggers 159 will contact the lugs 160 and further downward movement of the plunger will result in rocking of the head 152 in a clockwise direction about the rock shaft 153. As shown in Fig. 17, the head 152 is arranged to turn into a horizontal position in which it serves to square the bottom of the bag. Upon upward movement of the plunger 154 the head 152 will return to the position illustrated in Fig. 16 to facilitate withdrawal thereof through the bag contents.

In Figs. 19 to 22 inclusive there is shown a further modified form of bottom squaring member which may be used in a device such as disclosed in Fig. 1. As shown in these figures, the lower portion of a plunger, similar to plunger 54 in Fig. 1, is replaced by a pair of spaced parallel side members 254 which are joined adjacent their lower ends by a cross arm 255. The cross arm 255 is preferably triangular in cross-section in order to facilitate its upward movement through the contents of a filled bag and in order that its lower surface 256 may be flat. A pivot shaft 257 is supported at its ends by the portions of members 254 which extend below the cross-arm 255.

The bottom squaring head may comprise two relatively movable sections 258 and 259 each freely pivoted upon the shaft 257. As shown in the drawings, the sections 258 and 259 are each made of suitable strip material bent or assembled to form an open sided rectangle whose longer dimension is substantially equal to the width of the front and rear bag walls and whose shorter dimension is substantially equal to one-half of the width of the side walls of the bag. The free ends of the sections 258 and 259 are preferably bent inwardly as at 260 and 261 respectively and are perforated in order that they may be placed in telescopic relationship upon the shaft 257. The free ends extend somewhat beyond the shaft 257 and are preferably cut at an angle as indicated at 262. Under the influence of gravity the sections will rotate about the shaft 257 to the position illustrated in Fig. 19 wherein the angular ends 262 will bear upwardly against the surface 256 of the cross arm 255. The outer or bag engaging surfaces of the sections 258 and 259 may be rounded as at 263 and 264 to insure smooth operation.

It is intended that the bag squaring plunger just described shall be used with bag supporting and mouth opening means of the type hereinabove described. However, since the rectangle defined by the sections 258 and 259 may be fully as wide as the width of the side walls of the bag, it is preferred to shorten the bag supporting plate. As shown in Fig. 19, a plate 213 may be employed which is substantially similar to the plate 113 shown in Fig. 9.

The operation of a bag opening device including the bag squaring plunger just described will now be outlined in connection with Figs. 19 to 22 inclusive. A bag 250 is positioned upon the plate 213 and is clamped by the jaws 245. The mouth of the bag is opened by the action of arms 18 as hereinbefore described. The plunger 254 with the sections 258 and 259 in the position illustrated in Fig. 19 is then inserted through the bag mouth and into the bag body. As the plunger nears the lower limit of its travel the frictional engagement between the bag walls and the rounded surfaces of sections 258 and 259 will be substantially increased whereby the sections will be caused to rotate about the shaft 257 into the position shown in Fig. 20. When the sections thus rotate, they will serve to spread the lower portions of the bag walls apart and to draw the closed end of the bag upwardly into rectangular formation. The rectangular bottom thus formed may be of substantially the same dimensions as those of the opened mouth. The bag may then be filled, the bottom squaring plunger removed and the clamps 245 may be released as discussed above in connection with the machine illustrated in Fig. 1.

In Figs. 19 and 20 there is also illustrated a temporary bag holder which may be utilized in connection with any of the forms of my invention. The clamp jaws 245 may be recessed as at 265 to accommodate a leaf spring 266 anchored at 267 to the plate 213. It is preferred to locate the anchorage 267 above the stop 49. The spring 266 is urged into contact with the plate 213 and is outwardly curved at 268 to facilitate the introduction of a bag wall between the spring 266 and plate 213. The tension of spring 266 is preferably sufficient to hold an empty bag in adjusted position prior to setting of the clamp jaws 245 but is insufficient to interfere with gravitation of a filled bag to the conveyor 87 upon release of the clamps 245.

While the above detailed description has been made in order to comply with the patent statutes, it is to be understood that such description shall be taken in an illustrative rather than in a limiting sense and that the invention is subject to modifications and variations within the scope of the appended claims.

I claim:

1. In a device for opening and squaring a flattened bag to predetermined rectangular dimensions, a member insertible through the mouth of said bag, a head carried by said member, said head defining a rectangle of dimensions substantially equal to the rectangular dimensions of said bag when opened and squared, means to move said head relatively to said member to a position to facilitate insertion of said member and said head into said bag, and means to move said head relatively to said member when within said bag to spread the walls of said bag and to form a rectangular bottom therein of dimensions substantially equal to the dimensions of said head.

2. In a device for opening and squaring a flattened bag to predetermined rectangular dimensions, a plate insertible through the mouth of said bag to an extent substantially equal to the height of said bag when opened and squared, an abutment carried by said plate, a member movable relatively to said plate and insertible through the mouth of said bag, a rectangular head of dimensions substantially equal to those of said bag when opened and squared, said head being pivotally carried by said member, means to move said head relatively to said member to a position to facilitate insertion of said member and said head into said bag, an operating extension connected to said head and adapted to contact with said abutment, means to move said member relative to said plate when said member and plate are positioned within said bag to contact said extension with said abutment whereby to move said head to spread the walls of said bag and to form a rectangular bottom therein of dimensions substantially equal to those of said head.

3. In a device for opening and squaring a flattened bag to predetermined rectangular dimensions, a plate insertible through the mouth of said bag to an extent substantially equal to the height of said bag when opened and squared, means carried adjacent said plate for opening the mouth of said bag, an abutment carried by said plate, a member movable relatively to said plate and insertible through the mouth of said bag, a rectangular head of dimensions substantially equal to those of said bag when opened and squared, said head being pivotally carried by said member, means to move said head relatively to said member to a position to facilitate insertion of said member and said head into said bag, an operating extension connected to said head and adapted to contact with said abutment, means to move said member relative to said plate when said member and plate are positioned within said bag to contact said extension with said abutment whereby to move said head to spread the walls of said bag and to form a rectangular bottom therein of dimensions substantially equal to those of said head.

4. In a device for opening and squaring flattened bags to predetermined rectangular cross-section, a member insertible through the mouth of a bag, bottom forming means pivotally carried by said member, said means being normally urged to such position relative to said member as to facilitate insertion thereof with said member into said bag, and means to move said bottom-forming means relative to said member to a position wherein said bottom-forming means defines a rectangle of dimensions substantially equal to those of said predetermined rectangular cross-section.

5. In a device for opening and squaring a flattened bag, the combination of a member occupying a plane substantially coincident with the plane of one wall of said flattened bag; means carried adjacent said member and normally collapsible substantially into the plane thereof and adapted to enter the mouth of said bag; means thereafter operable for positioning said first named means normal to the plane of said member whereby to expand the mouth of said bag to predetermined rectangular shape and size; a plunger thereafter operable for entering the body of the bag to expand the same to said rectangular shape and size, said plunger comprising a pivotally mounted head normally occupying a position to facilitate insertion of said plunger into said bag; and means to move said head when within said bag to a position wherein said head defines a rectangle of shape and size substantially equal to the shape and size of said opened mouth.

6. In a device for opening and squaring a flattened bag, the combination of a member occupying a plane substantially coincident with the plane of one wall of said flattened bag; means carried adjacent said member and normally collapsible substantially into the plane thereof and adapted to enter the mouth of said bag; means thereafter operable for positioning said first named means normal to the plane of said member whereby to expand the mouth of said bag to predetermined rectangular shape and size; a plunger thereafter operable for entering the body of the bag to expand the same to said rectangular shape and size, said plunger comprising a pivotally movable head, means to move said head to a position to facilitate insertion of said plunger into said bag, and an operating extension connected to said head; an abutment carried by said member; and means to move said plunger into a position wherein said operating extension engages said abutment to move said head to a position wherein said head defines a rectangle of shape and size substantially equal to the shape and size of said opened mouth.

7. In a device for opening and squaring a flattened bag, the combination of a structural assembly movable as a unit into the flattened mouth of a bag without substantially spreading the same, said structural assembly including a plate lying substantially within the plane of one of the walls of said flattened bag mouth, and a pair of pivotally mounted arms normally collapsible substantially into the plane of said plate; means for pivotally moving said arms from the plane of said plate into planes normal thereto after said assembly has been moved into said flattened bag mouth, the pivotal movement of said arms being such that said arms will engage and move the remaining walls of the bag mouth whereby to open said bag mouth to predetermined rectangular shape and size; and a member insertable through the thus opened mouth of said bag for opening the body thereof and bringing the bottom thereof into predetermined rectangular shape and size substantially corresponding to the shape and size of said opened mouth.

HOWLAND F. BRIGGS.